United States Patent [19]

Hirsch

[11] 4,333,090

[45] Jun. 1, 1982

[54] SECURE KEYBOARD INPUT TERMINAL

[76] Inventor: Steven B. Hirsch, 305 Peck Dr., Beverly Hills, Calif. 90212

[21] Appl. No.: 146,404

[22] Filed: May 5, 1980

[51] Int. Cl.$^{3}$ .......................... G06F 3/02; E05B 45/06

[52] U.S. Cl. .......................... 340/365 VL; 340/825.3; 340/64; 340/365 R; 340/543; 340/712

[58] Field of Search ........ 340/365 R, 365 S, 365 VL, 340/712, 147 MD, 64, 543, 149 R; 361/172; 307/10 AT; 180/287

[56] References Cited

U.S. PATENT DOCUMENTS 3,587,051 6/1971 Hovey ................................ 340/543

3,812,403 5/1974 Gartner .............................. 361/172

3,893,073 7/1975 Angello ...................... 340/147 MD

OTHER PUBLICATIONS

*IBM Technical Disclosure Bulletin,* Jones, vol. 21, No. 4, Sep. 1978, pp. 1671-1672.

*Primary Examiner*—James J. Groody

*Attorney, Agent, or Firm*—Poms, Smith, Lande & Rose

[57] ABSTRACT

A secure keyboard input terminal is disclosed in which a secret user identification code number or other confidential data sequence formed from a set of alphanumeric characters (for example, the ten numerical digits 0 through 9) may be input secretly by a user, the terminal itself comprising (a) a plurality of input keys (in the case of the illustrated apparatus, 10 separate keys), (b) a corresponding plurality of character displays adapted for displaying said characters and (c) electronic circuitry for (1) apparently randomly associating selected ones of said character set to respective individual keys, (2) displaying to the user the character thus associated with each key and (3) translating a signal representing the actuation of a particular key by the user into a signal representing the particular character then associated with that key. In the illustrated presently preferred embodiment the individual keys are buttons provided with opaque walls surrounding a transparent central bore through which a seven segment numerical display character may be viewed, but only by a person located directly above the keyboard. An alternative embodiment is also illustrated in which the individual key areas have a central bore portion and a push button key adjacent to the central bore portion. One embodiment reassociates the displayed digits prior to the input of a data sequence in response to the manual actuation of a START key and retains the same scrambled association of digits to keys during the successive actuation of keys thus associated with the data sequence to the input. Other embodiments permit the user to manually initiate an automatic random (or apparently random) reassociation between the displayed digits (or other characters) and the individual keys at any time during the inputting of a data sequence or automatically reassociate characters and keys each time an individual data character (or predetermined number of characters) is input. Different types of random or apparently random sequence generating techniques may be employed.

11 Claims, 8 Drawing Figures

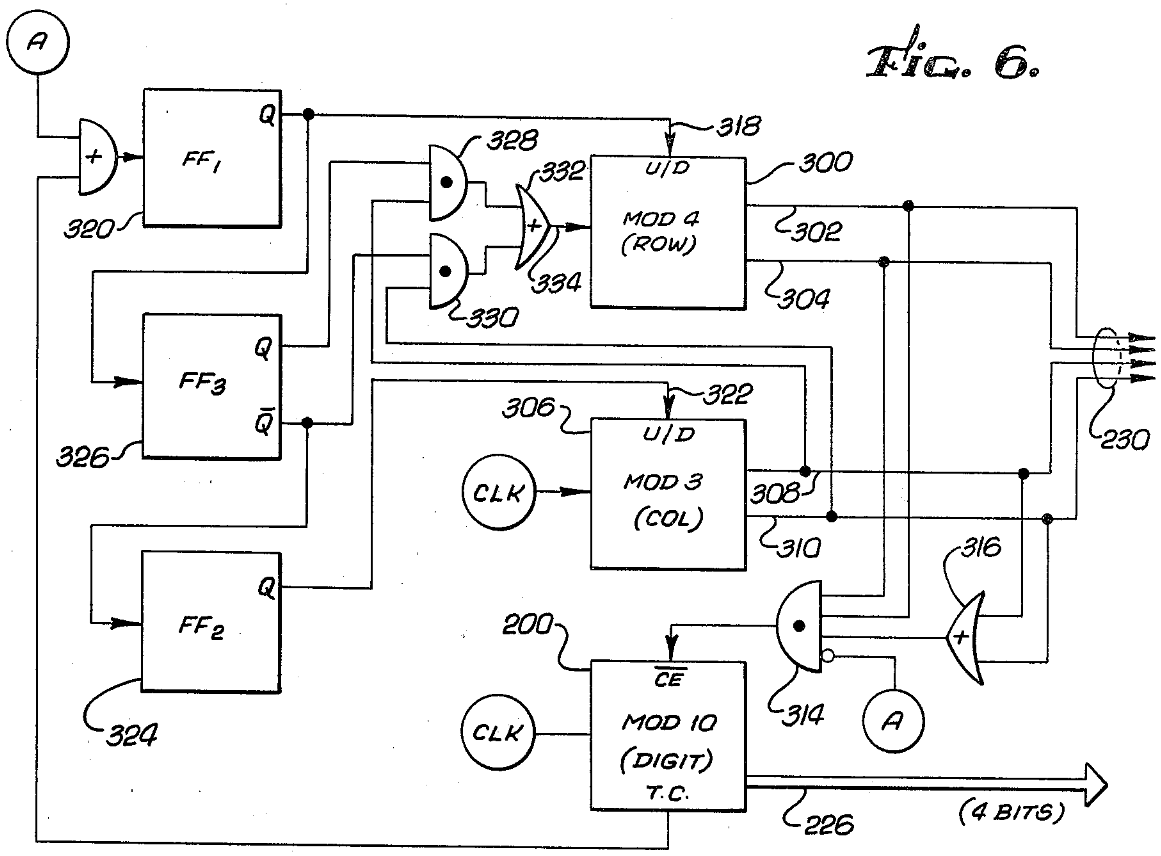
Fig. 6.
Fig. 6A.
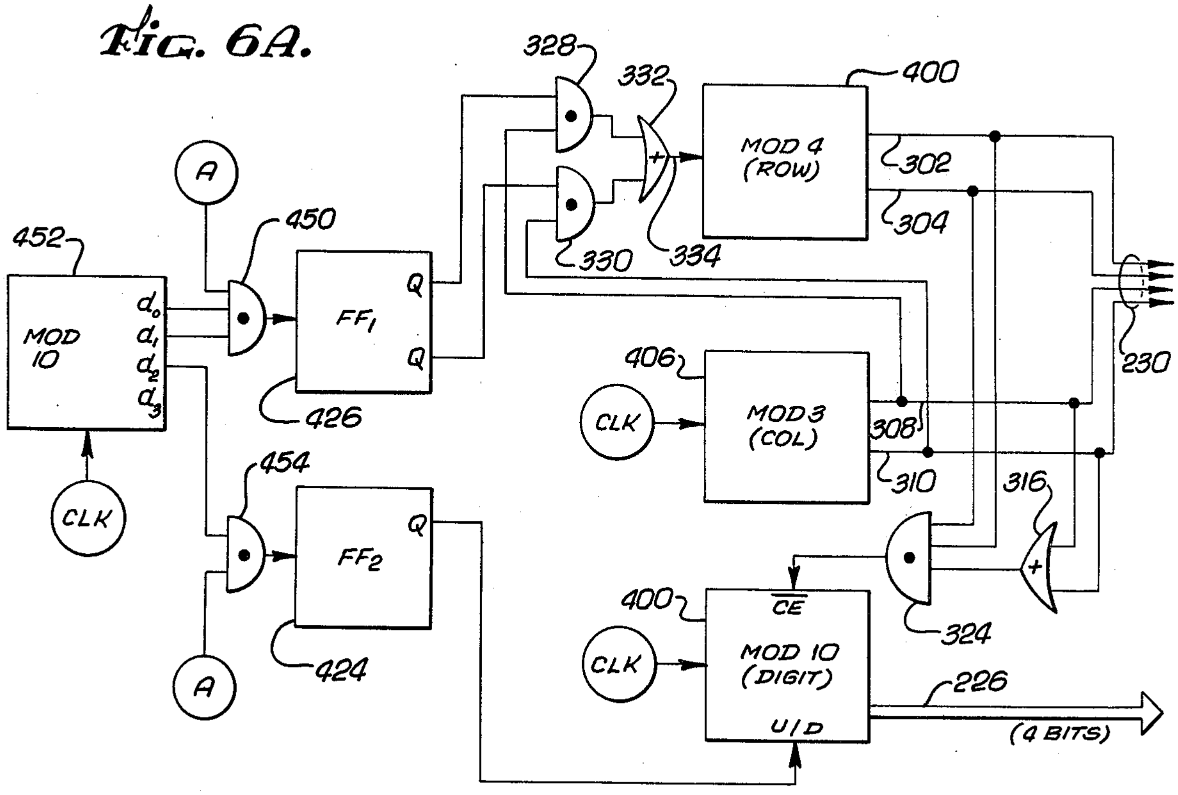

SECURE KEYBOARD INPUT TERMINAL

FIELD OF THE INVENTION

The present invention relates generally to data input devices and more particularly to such devices wherein data may be input by means of manually actuated keys.

BACKGROUND OF THE INVENTION

A. The Prior Art

The art is replete with various types of data entry devices wherein digital data in the form of electronic signals may be manually generated by the actuation of various types of data input keyboards including such keyboards employing thumb wheels, dials, a plurality of toggle switches, latching type key switches arranged in groups and interlocked such that only one keyswitch within a group may be activated at any one time, and arrays of momentary actuation pushbuttons in which the sequence that the individual buttons are actuated is also significant.

Typically, such keyboards have character indicia permanently associated with each of the key positions indicating the value of or meaning associated with the actuation of that particular key.

Accordingly, a bystander in the vicinity of such a prior art keyboard upon witnessing which keys were actuated (and if significant in what sequence) could then examine the keyboard itself to determine the actual value of the data that the user had just input, and the security of the data would thereby be compromised.

If the user was inputting secret or confidential information (such as a secret identification code known only to himself used to establish his identity to an electronic bank teller or other electronic device), then a possible security expedient would be to shield the keyboard with a privacy screen such that the fingers of the user operating the keyboard were hidden from view. However, if such a privacy shield were to be effective, it would also at least partially obscure the view of the user himself of the indicia associated with the various keys and could thus result in erroneous data being entered and/or the user being seriously inconvenienced. Such a shield would also add bulk and weight to the keyboard that would be undesirable in a self-contained portable application such as an electronic credit card verification system.

Such limitations of the prior art were in part addressed in U.S. Pat. No. 3,587,051 which discloses a device wherein the user responds to the random illumination of combinations of lights, each of the different lights being permanently marked with a different digit. The user would take each random pattern of illuminated and non-illuminated lights to generate mentally a data encoding key which he then would mentally apply to his secret combination to generate a derived code which he then would input to the device by actuating the appropriate switch or switches. Upon his successfully repeating such an encoding process for a predetermined number of different randomly generated patterns, the apparatus would be able to determine whether or not the user was in possession of the correct secret combination. Although such a prior art system might find utility in certain applications involving a limited number of sophisticated, highly trained users, it would not appear to be adaptable for use by the general public on an everyday basis.

OBJECT OF THE DISCLOSED EMBODIMENT

Accordingly, one objective of the present invention as exemplified by the embodiments disclosed herein is to provide a data entry keyboard terminal wherein a user may conveniently input secret data without fear of the data being compromised in the presence of a bystander.

Another objective is to provide a secure data entry keyboard wherein a user may input data, one character at a time, merely by activating in sequence the data keys then identified as being associated with the corresponding characters to be input, the apparatus being provided with means to reassociate the characters with the keys in a random (or apparently random) fashion and to present to the user the results of such reassociation in a convenient form while data is being input.

Yet another related objective is to provide apparatus for scrambling a set of data input characters with respect to the data input keys of an input terminal, for displaying the respective characters in association with their respective associated keys such that only the user of the terminal is aware of the exact nature of the association (and thus a bystander observing what keys were actuated in what sequence still would not be able to determine what characters had been input), and for generating in response to each key actuation, a signal representing the then associated character.

Other objectives, including those of a more specific nature, will become apparent upon a reading of the following Detailed Description and the Drawings appended thereto.

BRIEF SUMMARY

Briefly, the foregoing and other related objectives (as will become more clear hereinafter) may be achieved in a presently preferred embodiment of a secure keyboard input terminal in which a secret user identification code number or other confidential data sequence formed from a set of alpha-numeric characters (for example, the ten numerical digits 0 through 9) may be input secretly by a user, the terminal itself comprising (a) a plurality of input key buttons (in the case of the illustrated apparatus, 10 separate buttons) (b) a corresponding plurality of individual character displays adapted for displaying individual ones of said characters, and (c) electronic circuitry for (1) apparently randomly associating selected ones of said character set to respective individual keys, (2) displaying the assigned character associated with each key to the user and (3) translating a signal resulting from the actuation of a particular key into a signal representing the particular character then associated with the key.

In the illustrated presently preferred embodiment, the individual key buttons are provided with opaque walls surrounding a transparent central bore through which a seven segment numerical display character may be viewed, but only by a person located directly above the keyboard, thereby further enhancing the security and privacy afforded by the terminal.

In an alternative embodiment which is also illustrated the keyboard comprises individual key areas defined within a transparent cover plate, each of the key areas being provided with a transparent central bore defined by opaque walls through which a seven segment numerical display character located below the cover plate may be viewed and with an adjoining push button operatively connected to an electric contact.

Although the illustrated and described presently preferred embodiment associates the digits 0 through 9 with the ten data keys of the terminal, such that each digit is assigned to one and only one key, the invention would also have utility if the same digit might be assigned to more than one key at a time or if not all members of the character set were always associated with at least one key. Moreover, although the depicted embodiment reassociates the displayed digits prior to the input of a data sequence in response to the manual actuation of a start key and retains the same scrambled association of digits to keys during the successive actuation of keys thus associated with the data sequence being input, in certain types of applications in which the security of the input data overrides any consideration of user convenience, then in accordance with other embodiments it might be preferable to permit the user to manually initiate the automatic random reassociation between the displayed digits (or other characters) and the individual keys at any time during the inputting of a data sequence by means of a separate rescramble key, or even to cause the displayed characters to become automatically rescrambled each time an individual data character (or predetermined number of characters) is entered.

Furthermore, although a disclosed exemplary preferred embodiment associates the digits 0 through 9 with the ten keys of the keyboard utilizing simplified types of random sequence generator digital circuits which generate only 40 or 80 of the 3,628,800 possible permutations of ten different characters or key positions, the invention would also find application in which different types of random or apparently generating techniques were employed.

BRIEF DESCRIPTION OF THE DRAWINGS

For a better understanding of the present invention as exemplified in presently preferred and alternative embodiment thereof, reference is made to the following Detailed Description and the appended Drawings in which:

FIG. 6 shows an exemplary type of Random Sequence Generator usable in the arrangement illustrated in FIG. 5 shown together with the Modulo 10 Counter of FIG. 5 and the control signals that effect the concurrent operation of said generator with said counter.

FIG. 6A shows an alternative exemplary type of Random Sequence Generator.

DETAILED DESCRIPTION OF THE DRAWINGS

Figure 1:
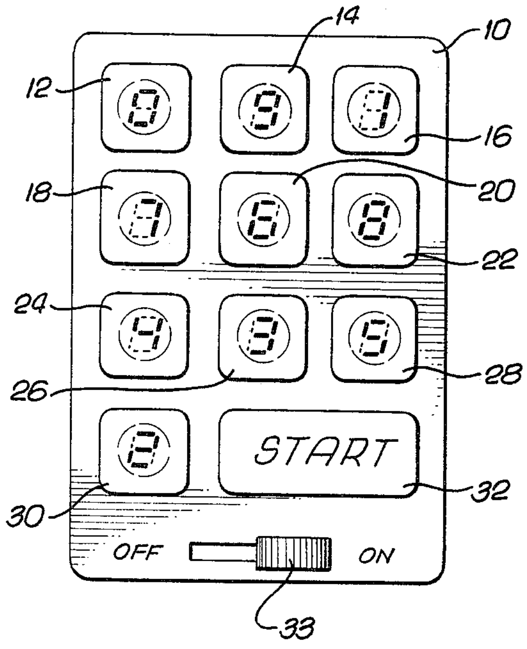
FIG. 1 illustrates in plan view a secure keyboard input terminal in which the digits 0 through 9 have been apparently randomly assigned to the respective keys of a 10 key keyboard prior to the input of data.

Referring now with particularity to FIG. 1, it may be seen that in a presently preferred embodiment of the present invention, there is provided a secure data input keyboard terminal designated generally by the reference numeral 10 having ten data pushbuttons designated respectively by reference numerals 12, 14, 16 . . . 30, with the first, second and third keys (12, 14, and 16) being arranged in a first row; the fourth, fifth, and sixth keys (respectively designated by reference numerals 18, 20, and 22) being arranged in a second row; seventh, eighth, and ninth keys (designated respectively by reference numerals 24, 26, and 28) located in a third row; while the tenth key (designated by the reference numeral 30) is by itself in a fourth row. Terminal 10 is also provided with a start key 32, the function of which will be more clear hereinafter, and with an on-off switch 33.

Referring again with particularity to the apparatus illustrated in FIG. 1, it may be seen that as depicted, first pushbutton 12 is presently displaying the numeral "0" to the user, second key 14 is displaying the numeral "9", third key 16 is displaying the numeral "1", fourth key 18 is displaying the numeral "7", fifth key 20 is displaying the numeral "6", sixth key 22 is displaying the numeral "8", seventh key 24 is displaying the numeral "4", eighth key 26 is displaying the numeral "3", ninth key 28 is displaying the numeral "5", and tenth 30 is displaying the numeral "2".

Also visible in FIG. 1 in faint dashed outline below the top surface of each of the ten keys 12, 14, etc. are the non-illuminated segments of a conventional 7-segment light-emitting diode display which when illuminated in various other combinations, may be used to display other digits or even non-numerical alpha characters.

Figure 2:
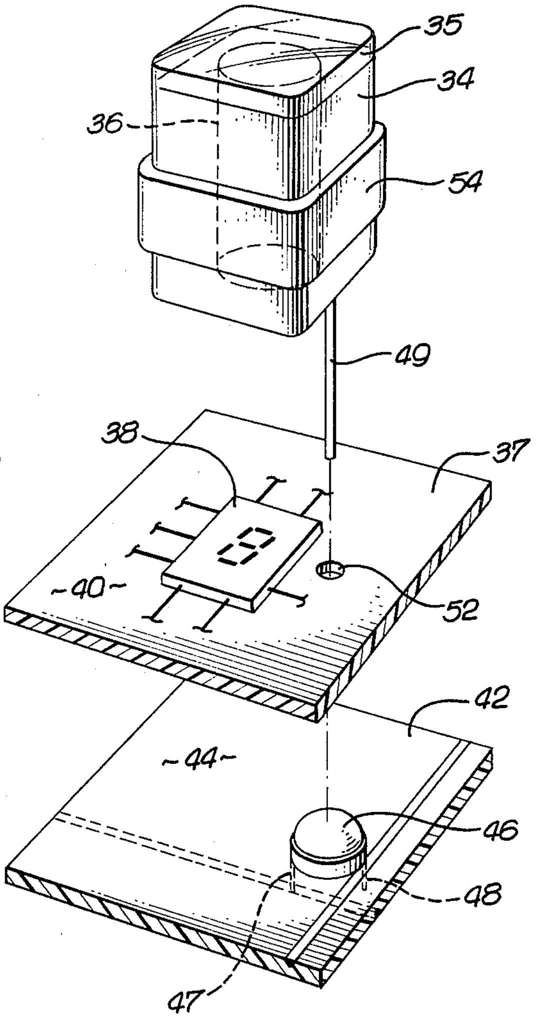
FIG. 2 is an exploded assembly view showing how the individual key buttons, the seven segment numerical displays and the matrix type switch assemblies utilized in the terminal of FIG. 1 may be assembled with respect to one another.
Figure 3:
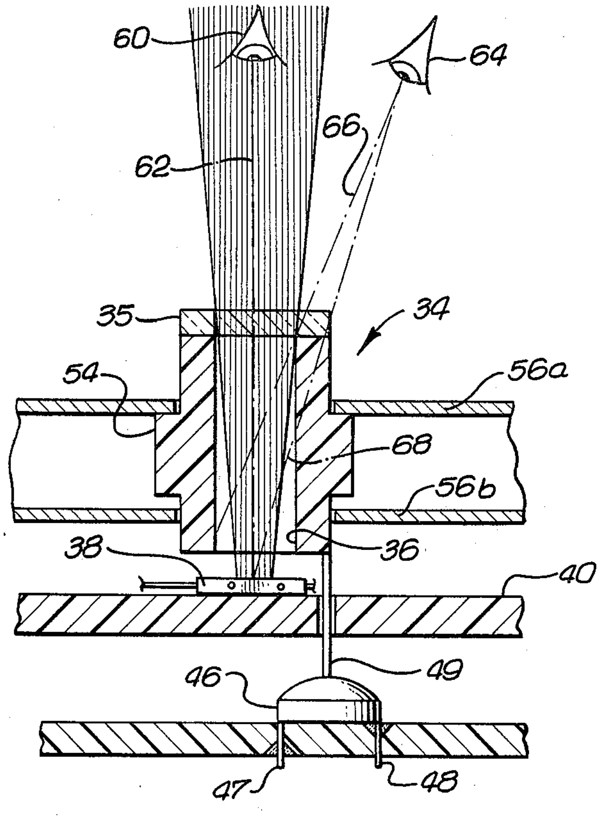
FIG. 3 illustrates in cross section the components of FIG. 2 in their assembled relationship to one another, and to the eye of the user.

Since when the terminal is in use, the segmented display associated with each of the ten keys presents a different digit character each time the START key 32 is depressed and since the individual data keys 12, 14, etc. are utilized not only to display characters associated therewith, but also to manually input data sequences, in the illustrated embodiment the individual pushbuttons are at least partially transparent and are mounted above minature light emitting 7-segment light emitting diode character displays located on an upper surface of a first circuit board, and have an extension extending through said upper circuit board to an operative position relative to a snap action contact switch preferably mounted to a second circuit board therebelow, as will become more clear hereinafter with particular reference to FIGS. 2 and 3.

Although the embodiment of the invention illustrated in FIG. 1 employs transparent or at least partially transparent key buttons through which the individual segmented displays, each mounted directly below its respective button, may be viewed, those skilled in the design and construction of digital data terminals will doubtless give consideration to other techniques for physically associating a particular character display with a particular pushbutton, such as mounting the display to one side of its respective button, or by mounting the ten displays at a location somewhat spatial arrangement of four rows and three columns (so it will be readily apparent to the user which display corresponds to which pushbutton), or by labeling the individual keys and employing corresponding labels on the ten individual character displays.

Furthermore, although a conventional ten key input keyboard arrangement is illustrated in which the ten digits are arranged in three rows each of three digits and a fourth row of only one digit, it would obviously be possible to arrange the ten pushbuttons all in a single row, in which case the ten associated character displays may also function as a ten digit output display.

At this point, it should also be observed that although not apparent from the view of the apparatus shown in FIG. 1 (but indicated diagramatically in FIGS. 2 & 3, the individual character display is preferably provided with a collimating light shield formed by the opaque walls of the associated key button such that the displayed character may be seen only when the viewer's eye is located within a narrow range of angle with respect to the display and thus the characters displayed may be seen by only one individual at a time. This has the advantageous effect of furthering the security of the data input by the user, since even if another individual were in the immediate area, even if he observed which key is then being depressed by the user, he would be unable to determine what data was being input by the user, since he would not know what character was being displayed as the character then associated with a particular key.

Those familiar with the construction of conventional input and output data terminals who are otherwise skilled in the art will also be familiar with other structures that would have the effect of restricting the viewing angle from which the displayed characters may be clearly viewed, such as molded magnifying lenses placed above the displays. Depending upon the degree of security required, and the characteristics of such other structure, they may be substituted for, or serve as an adjunct to, the collimating light shield discussed in detail herein. In any event, it is clearly desirable to design the physical characteristics of the mounting of the terminal's keyboard character displays such that a casual bystander cannot readily perceive the individual characters then being displayed and thereby, merely by watching which buttons are being depressed in what sequence, knowing the secret data sequence being input by the user.

As a further aid to security, the device displays a newly generated sequence of associated key characters only after the user has pressed START button 32, and, as soon as the user has completed inputting his data, the characters are no longer displayed.

One presently contemplated application for such a secure data input keyboard terminal is in a Credit Card Verification System; however, it should be observed that the present application is directed to a type of data input terminal which will doubtless find utility in other applications in which it is desired to manually input data by means of a keyboard without compromising the data's security even in the presence of casual observers.

As examples of such other possible applications, I would mention automated or semi-automated bank tellers connected to a bank's central computer, electronic reprogrammable locks such as may be employed in hotels and apartments, electronic combination locks operating the doors to bank vaults or other secure restricted access areas, or the like—this list is by no means exhaustive. Depending upon the particular application, it may be desired to depart from the configuration of the terminal illustrated in FIG. 1 by providing more or fewer keys, and/or by employing character sets containing a greater or lesser number of alpha-numeric character than the ten digit illustrated in the Figure.

Referring now to FIGS. 2 and 3, which as noted previously are respectively an exploded assembly view and a cross-section view of a button, display, and switch utilized in the FIG. 1 apparatus, it may be seen that the terminal's keyboard may be conveniently integrated with conventional segmented displays by means of at least partially transparent pushbuttons 34 each provided with a transparent cover plate 35 (preferably of the same color as the light emitted by the light emitting diodes forming the segments of individual characters so that the only thing visible through the cover plate are the illuminated segments forming the displayed character). Cover plate 35 covers the upper end of a central bore 36 (which could assume the form of an actual opening machined or molded along the central or vertical axis of the opaque plastic material forming the body of pushbutton 34, or which alternatively may be formed of a solid transparent material set within said opaque material).

Below the array of individual pushbuttons 34 there is provided an upper circuit board 37 having a plurality of 7-segment displays 38 mounted to an upper surface 40 thereof, and lower printed circuit board 42 having mounted on its upper surface 44 a plurality of sealed snap-action type contacts arranged in a row and column matrix, the exterior of one of which being shown in the figures at reference numeral 46, with its first (row) terminal 47 and second (column) terminal 48.

Each pushbutton 34 is provided with a downwardly protruding leg 49 at one lower edge thereof. Leg 49 passes through an opening 52 provided in upper circuit board 36 and operatively engages the associated snap-action switch contact 46. The portion of button 34 immediately above and below a collar 54 co-acts with corresponding openings of upper and lower key guide plates 56*a* and 56*b* (see FIG. 3) to locate each individual key 34 with respect to its corresponding 7-segment display 38 and snap-action switch 46. Collar 54 itself serves to limit the vertical travel of the key button. Advantageously, contact 46 may have sufficient spring action to return key button 34 to its uppermost position (collar 54 touching upper guide plate 56*a*) when the key is no longer depressed. Alternatively, as second leg (not shown in the drawings) could co-act with a separate return spring to effect the upward return movement of button 34.

Figure 1A:
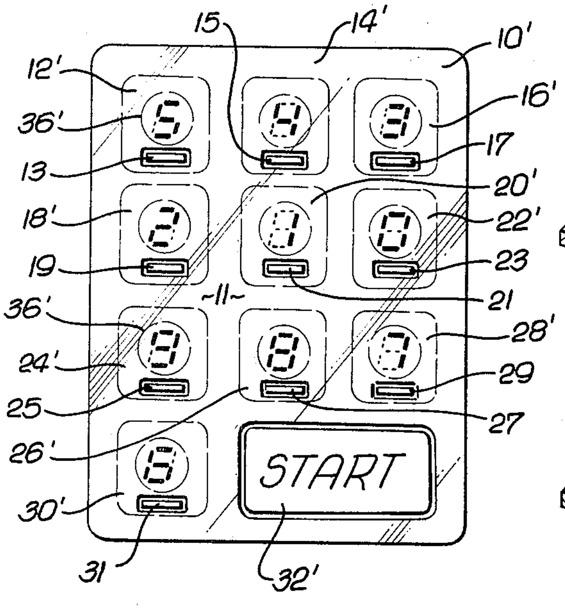
FIG. 1A illustrates an alternative embodiment to that illustrated in FIG. 1 in which a different apparently random assignment of digits to keys is visible and which further differs from the embodiment of FIG. 1 in that the push button key is located next to rather than above the character display.

Referring to FIG. 1A, which is noted above, illustrates embodiment of a secure input keyboard alternative to that illustrated in FIG. 1, it may be seen that in overall appearance there is a strong similarity between these two embodiments. Accordingly, in the case of corresponding or related elements in both figures, the corresponding structure in the alternative embodiment has been designated with the same reference numeral, but differentiated by means of a prime symbol (′).

In particular it may be seen that there is provided an input keyboard terminal designated generally by the reference numeral 10′, having ten individual key areas designated respectfully by the reference numerals 12′, 14′, 16′, 18′, 20′, 22′, 24′, 26′, 28′, and 30′.

Furthermore, the alternative keyboard 10′ is provided with a start button 32′, which provides a function similar to the start button 32 of the FIG. 1 presently preferred embodiment.

As illustrated in FIG. 1A, the digit "5" is presently associated with first key 12'. The second and third keys of the first row show respectively the digits "4" and "3". The remaining rows and columns as displayed are presently associated with the digits "2", "1", "0", "9", "8", "7" and "6".

It will be recalled that in the case of the presently preferred embodiment of the FIG. 1 the keyboard terminal is provided with separate relatively large push buttons, each of the push buttons having integral therewith a collimating light shield for providing further privacy to the user while he is inputting secret data. In the case of the FIG. 1A embodiment, the same collimating light shields are retained, but are no longer physically part of a movable push button assembly, but rather are formed by the opaque lower portion of keyboard cover plate 11, the upper portion of said cover plate being transparent in the same manner as the individual push button cover plates 35 of the FIG. 1 embodiment.

Instead of relatively large movable push buttons, cover plate 11 is provided with ten key areas each defined by a suitable technique (such as silk screen printing, an engraved area on the upper surface or the use of different color plastics integrally molded as one unit) so that the digit display portion of the key area formed by the collimating light shield (one of which is being shown in broken outline at reference numeral 36') is in the upper portion of the key area and a relatively small push button 13 is located at a lower portion of the same key area. In this manner there results a form of keyboard which is less prone to jamming and smearing problems caused when the keyboard is used in a dirty location with possibly greasy fingers. Similarly, key areas 14' through 30' are provided with respective push buttons 15 through 31.

As may be clearly seen from FIG. 3, when the eye of the user (indicated diagramatically in the FIG. at reference numeral 60) is directly above the keyboard such that his line of sight 62 is parallel with the principal axis of push button bore 36, and approximately perpendicular to upper keyboard guideplate 56*a*, then the light from the individual light emitting diodes forming character display 38 is able to travel unimpeded through central bore 36 and upper plate 35 to the viewer's eye 60 along line of sight 62. If, however, the viewer's line of sight is somewhat displaced from that just described (indicated diagramatically by the dotted viewer's eye shown at reference numeral 64 and line of sight 66), the light emitted by character display 38 in the direction of a thus displaced viewer 64 (the path of such light being shown diagramatically at reference numeral 68) is blocked by the opaque sidewalls of keybutton 34 and accordingly all the viewer sees is a dark void, even when some or all of the LED segments forming a particular displayed character are illuminated.

The identical light collimating/light blocking function results from the alternative embodiment shown in FIG. 1A, and will accordingly not be described in further detail herein.

Figure 4:
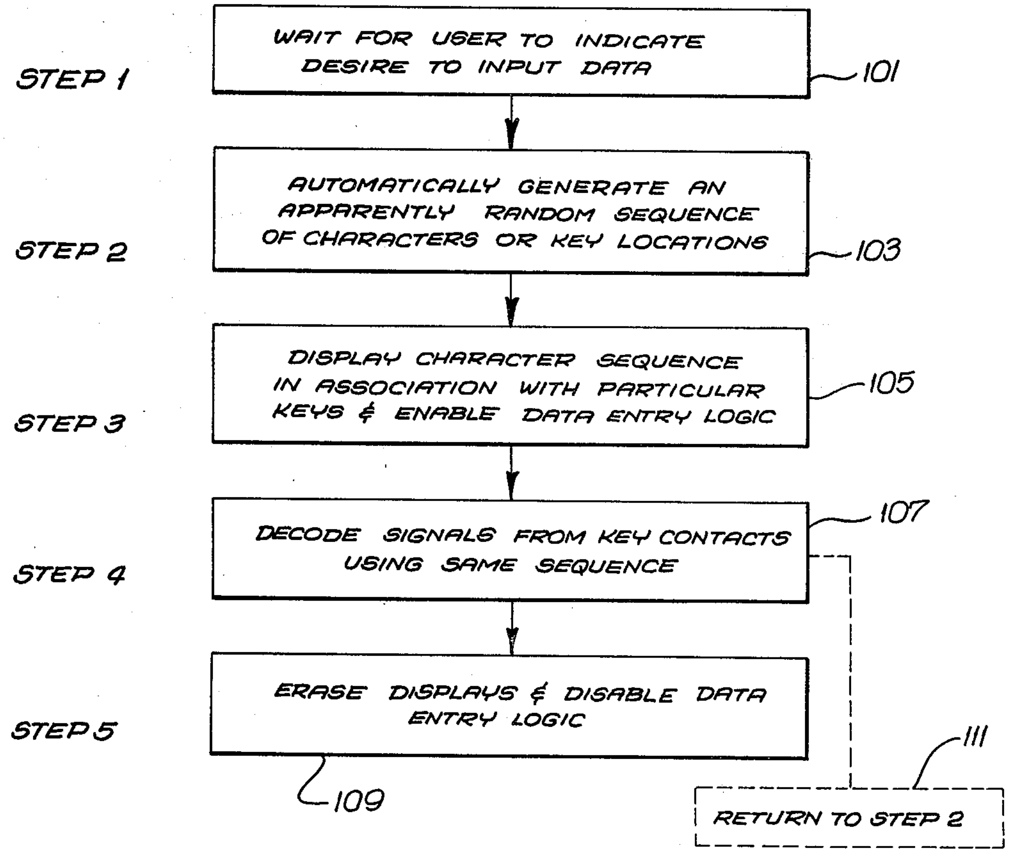
FIG. 4 is a method flow chart illustrating a presently preferred embodiment of the method aspects of the present invention.

Referring now to the flow chart of FIG. 4, it will be clearly seen that in accordance with its intended method of operation, the apparatus of FIG. 1 initially awaits an indication from the user of his desire to input data signified by the pressing of START button 32, this first step being indicated diagramatically in FIG. 4 by block 101.

After the START button has been depressed, the electronics contained within the terminal automatically generates a coding scheme in the form of an apparently random sequence of key locations, a function indicated diagramatically in FIG. 4 by block 103.

As the third step of the method, the electronic circuitry of the apparatus then causes the individual character displays to display the characters in association with particular keys of the keyboard in that same apparently random sequence, and enables the circuitry's data logic such that the user may then input his secret string of data, a function indicated diagramatically in the FIG. 4 by block 105.

As noted previously, preferably the display of the characters in the randomized sequence is accomplished in such a manner that bystanders are unable to observe which character is associated with which key, so that even if a bystander observes which fingers of the user pushed which keys, he still does not know what data was being input by the user.

The data entry logic having been enabled, the user may now enter his secret string of data by depressing the various keys associated with the string's characters and the terminal automatically translates the input signals originating from the key contacts into a decoded data string by utilizing the same apparently random sequence, a function indicated diagramatically in FIG. 4 by block 107.

Finally, once the user has completed entry of his secret data, the terminal then automatically erases the displayed characters and disables the data entry logic, thereby maintaining the integrity and secrecy of the input data string, a function indicated diagramatically by block 109.

Alternatively, the user could manually input a signal by means of a manual RESCRAMBLE switch (which could be on/off switch 33 or START button 32) or the system could automatically generate a Rescramble signal once a predetermined number of data characters having been entered or a predetermined time period has elapsed, which would start the commencement of a new operational cycle in which a new (but again apparently random) sequence of key locations is generated and replaces the old sequence, a function indicated in FIG. 4 diagramatically by block 111 (which is shown in dashed lines to indicate its alternative nature).

Figure 5:
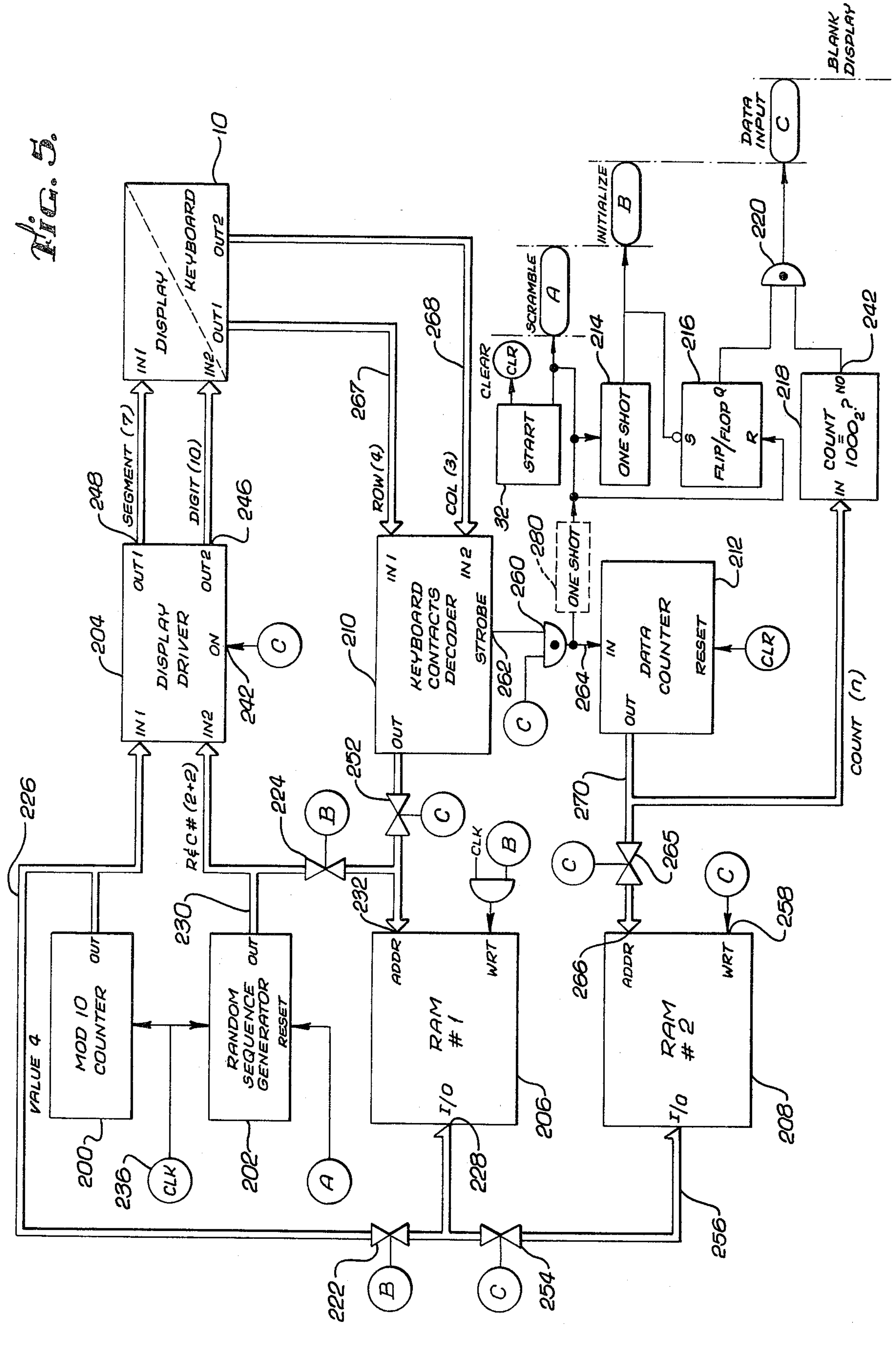
FIG. 5 depicts various electronic circuits employed in apparatus of the type illustrated in FIG. 1 and the manner they may be connected to one another.

Referring now generally to FIG. 5, it may be seen that the electronic circuitry of the present invention includes separate circuits for performing the following major functions:

- a Modulo 10 counter (indicated by block 200)
- a Random Sequence Generator (indicated by block 202)
- a Display Driver (indicated by block 204)
- a first Random Access Memory (indicated by block 206)
- a second Random Access Memory (indicated by block 208)
- a Keyboard Contacts Decoder (indicated by block 210)
- a Data Counter (indicated by block 212).

Additionally, the electronics includes the following components for generating timing and control signals:

- a one-shot pulse generator 214
- a Flip-flop 216
- a comparator 218, and
- AND-gate 220.

START button 32 (see also FIG. 1) generates a Scramble signal "A", the length of which is more or less random, being determined by how long the START button is held down by the user. Scramble signal A is utilized as the Reset input to Random Sequence Generator 202 to cause Random Sequence Generator 202 to generate a different apparently random sequence of 4-bit addresses each time the START button is depressed. START button 32 also generates a Clear signal CLR which serves as the Reset input to Data Counter 212. It may be noted that although in certain applications Scramble signal A and Clear signal CLR may be one and the same, in other alternate preferred embodiments (e.g., if the characters displayed in association with the various key buttons are rescrambled in the middle of a data sequence) it is convenient to have two separate and distinct signals.

Preferably, START button 32 generates manual Scramble signal A by means of a conventional contact debounce circuit (for instance a pair of cross coupled NAND-gates), so that spurious control signals are obviated.

Scramble signal A is also utilized by one-shot circuit 214 to generate an Initialization signal "B" once START button 32 has been depressed and released. Initialization signal B is employed by first data gate 222 controlling data through output bus 226 from Modulo-10 Counter 200 leading to I/O port 228 of first RAM 206; this signal also controls second data gate 224 located between the output 230 of Random Sequence Generator 202 and the Address input port 232 of first RAM 206.

When these two gates are enabled by Intialization signal B and signal B is also applied to the Write Enable input 234 (pulsed by ANDing with CLK to ensure a proper write operation) of first RAM 206, then the binary equivalents of digits 0 through 9 cyclicly output by Modulo 10 Counter 200 will be loaded sequentially into the RAM in accordance with the apparently random sequence of addresses output by Random Sequence Generator circuit 202 (which it may be noted outputs a four digit address, the first two digits of which designate particular one of the four rows associated with the ten key arrangement illustrated in FIG. 1 and the second two digits of which specify a particular one of the three columns). Obviously, the duration of Initialization signal B as measured by the clock signal CLK must be sufficient to guarantee that at least one full cycle of 10 different digits will have been loaded into the ten different addresses corresponding to the ten different actual keys in the keyboard; however, since the outputs of Modulo 10 Counter 200 and of Random Sequence Generator circuit 202 are cyclic in nature and maintained in synchronization with each other by means of a common clock signal CLK (and if required a Count Disable signal $\overline{CE}$) the fact that Initialization signal B might in fact have a duration not equal to exactly one such full cycle (or even to an integral multiple of one such cycle) is of no moment.

In accordance with the exemplary embodiment of the Random Sequence Generator circuit 202 shown in more detail in FIG. 6, the Random Sequence Generator circuit is designed such that it automatically generates a Count Disable signal $\overline{CE}$ whenever the Generator is generating a combination of row and column designations not corresponding to any terminal key location actually in use; thus, assuming that the first row is designated by the binary number "00", the second row by the binary number "01", the third row by the binary number "10" and the fourth row by the binary number "11"; the first column by the binary number "00", the second column by the binary number 01", the third column by the binary number "10"; since there is but one key in the fourth row, its designation will be "1100" and binary numbers "1101" and "1110" represent non-existent keys in the second column of the fourth row and in the third column of the fourth row respectively, and Counter 200 does not increment when those latter two (non-existent) locations are output by the Random Sequence Generator. Alternatively, the random sequence generator 202 could be designed such that it automatically bypasses row and column designations not corresponding to any actual terminal key, in which case the Count Disable signal $\overline{CE}$ would not be required. In any event, in order that the particular sequence of digits illustrated in FIG. 1 be associated with the particular keys of the keyboard as shown therein, then, at the same time the Modulo 10 Counter 200 outputs a binary number corresponding to the decimal digit "1", which as illustrated in FIG. 1 is associated with the key in the third column of the first row, the corresponding output of the Random Sequence Generator will be "0010": The decimal number "2" is associated with the fourth row at the first column, accordingly the second number generated in sequence by Generator circuit 202 will be "1100", the third number will be "1001", the fourth will be "1000", the fifth "1010", the sixth "0101", the seventh "0100", the eighth "0110", the ninth "0001", the tenth (the 0 character) "0000", whereupon the sequence will again repeat itself.

At this point, it will be noted that although the ten characters are output in their normal arithmetic sequence by Modulo 10 Counter 200, and the ten associated locations of actual keyboard keys are output in varying random sequences by Random Sequence Generator 202, it would also be possible to generate the address signals corresponding to locations on the keyboard always in the same sequence, and to generate the data signals applied to I/O ports 228 in varying random sequences. Either way, the addresses in first RAM 206 corresponding to the ten active data keys of input terminal 10 would be loaded with the binary representations of the respective associated decimal digits in an apparently random sequence.

Conversely, it would also be theoretically possible for first RAM 206 to be sequentially loaded with data designating associated key locations, with the address itself within the random access memory corresponding not to a particular key location, but rather to a particular character. However, such an arrangement would needlessly complicate the unscrambling of data input by the keyboard and detected by Keyboard Contacts Decoder 210 as will become more evident hereinafter, and is accordingly not presently preferred.

I would mention that in certain applications in which it is foreseeable that Modulo 10 Counter 200 might lose synchronization with Random Sequence Generator 202 (even though they are both driven by the same clock CLK signal 236), it may be preferable to have the Value input via terminal $IN_2$ of Display Driver Circuit 204 be provided not directly by the Modulo 10 Counter itself but rather from I/O output 228 of first RAM 206. In that event, it might be necessary to modify somewhat the embodiment shown in FIG. 5 by providing an additional data gate between the Modulo 10 Counter and data bus 226, and by modifying the various control signals associated with the respective data gates such that when a Strobe signal is present on Strobe line 262 from Keyboard Contacts Decoder 210, then the address supplied on Address input 232 of first RAM 206 is the output from Decoder circuit 210 and the I/O port 228 of first RAM 206 is connected with the I/O port of second RAM 208, but when no such Strobe signal is present on Strobe line 262, then the address supplied to first RAM 206 is the row and column designation generated by Random Sequence Generator circuit 202 and the data thereupon output by the first RAM is applied to the $IN_1$ input of the Display Driver circuit 204. Since the data stored in first RAM 206 remains invariant after the Initialize phase is terminated, it is clear that such an alternative embodiment will eliminate all such synchronization problems and will guarantee that the character displayed as being associated with a particular key will of necessity be the character stored in second RAM 208 when that key is depressed.

In any event, what is required is a means for automatically apparently randomly assigning scrambled characters to respective individual keys and storing or retaining the particulars so that keyboard data inputs may subsequently be unscrambled.

As noted above, after the START button has been released, synchronization is maintained between the Modulo 10 Counter 200 and the Random Sequence Generator 202 by means of Clock pulses signal CLK 236 from a common clock and perhaps by a Count Disable signal $\overline{CE}$ (see FIG. 6).

Thus it will be seen that during the more or less fixed time intervals that the Initialization signal B is output by one-shot circuit 214, ten binary numbers corresponding to decimal digits 1 through 10 have been loaded into addresses in first RAM 206 corresponding to the location of the ten data keys of data input terminal 10 in accordance with a randomly generated sequence.

Once Initialization signal pulse B has again gone low, Flip-flop 216 is set by the inverted Initialization signal $\overline{B}$ and accordingly its Q output goes high; assuming that comparator circuit 218 also has a high output at NO terminal 242, then the Data Enable signal "C" output from AND-gate 220 will go high.

At this point it should be remarked that Data Enable signal C will be high only if Start signal A and Initialization signal B are low; otherwise the Q output of Flip-flop 216 will be low, and accordingly the output from AND-gate 220 will be low.

Data Enable signal C is applied to ON input 242 of Display Driver circuit 204 and accordingly the Display Driver circuit supplies the ten character displays of terminal 10 with signals for illuminating (in time multiplexed fashion) the appropriate segments of the various light emitting diodes. The output of the Display Driver circuit is a signal on one of the 10 digit lines from second Output Port 246 indicating which of the character displays is then being driven (this signal being directly derived from the output 230 of Random Sequence Generator 202) and a corresponding signal at first Output Port 248 indicating which of the seven segments of that particular character display are then to be illuminated (this latter output being derived in a conventional manner from the binary output of Modulo 10 Counter 200). Conversely, when Data Enable signal C goes low, all outputs from Display Driver circuit 204 are disabled and the individual character displays go blank.

Data Enable signal C also controls the flow of data from Output Port 250 of Keyboard Contacts Decoder circuit 210 by means of third data gate 252. Data Enable signal C is also applied to fourth data gate 254 located between I/O port 228 of first RAM 206 and I/O port 256 of second RAM 208. Additionally, Data Enable signal C is applied to the Write Enable terminal 258 of second RAM 208 and AND-gate 260 located between Strobe output 262 of Contacts Decoder circuit 210 and the input 264 of Data Counter circuit 212. Finally, Data Enable signal C is applied to fifth data gate 265 controlling the flow of data from Data Counter 212 to Address port 266 of second RAM 208.

At this point, it may be noted that Keyboard Contact Decoder circuit 210 is conventional in nature and may, for instance, comprise a conventional multiplex scanner circuit which sequentially applies a signal to the four rows 266 of the matrix formed by the ten contacts of the keyboard portion of data terminal 10, at the same time testing for the presence of said signal on one of the three columns 268 of said matrix, thereby detecting a row in electrical contact with one of the three columns 268 in said matrix array. When such a contact is detected and a predetermined period of time has elapsed (so that any "bounce" characteristic of the individual electric contacts has effectively been eliminated) a "Strobe" pulse is generated at Strobe output 262 and a meaningful four bit digital word is present at Output port 250, the first two bits of which signifying a particular row, and the second two bits signifying a particular column.

Furthermore, Data Counter circuit 212 in response to the Strobe signals output by the Contact Decoder circuit 210 increments a count address used to control the operation of second RAM 208, which (since its Write Enable input 258 has already been enabled by Data Enable signal C) accordingly advances the address to which data from first RAM 206 is routed, leaving the current output of first RAM 206 permanently written into the preceding address.

Since first RAM 206 has previously been loaded during the Initialization sequence with data representing the characters displayed in association with the particular keys of the keyboard; accordingly, as each key is successively depressed, a signal designating the particular key is output by Contact Decoder circuit 210 to address first RAM 206, and RAM 206 thereupon outputs the representation of the character then associated with that particular key as an input to second RAM 208 and (shortly thereafter), a Strobe pulse is generated by Contact Decoder 210 which advances the count maintained by Data Counter circuit 212, and the corresponding address input to second RAM 208 is incremented, thereby leaving the decoded data input by the user permanently written into said second RAM, with each successive address in the second RAM corresponding to a successive entry of a particular digit or character from the keyboard.

It will be noted that the output Count 270 from Data Counter circuit 212 is also input to Comparator circuit 218 where it is compared with binary "1000" (corresponding to decimal "8"). Since, at least for the presently preferred embodiment illustrated in the Figure, it is intended that data sequences input by the user will always comprise exactly eight digits or characters, and since Data Counter 212 is reset to binary "0" by Clear signal CLR prior to the data entry logic being enabled, eight digits input by means of keyboard 10 will result in eight Strobe pulses being output on Strobe line 262, eight words of corresponding data being written into eight successive locations in second RAM 208, and Counter 212 being advanced to the binary equivalent of the number "8", whereupon the output from Comparator 218 will go low forcing the Data Enable output C from AND-gate 220 also to go low, thereby inhibiting further entry of data from keyboard 10 into second RAM 208 and additionally inhibiting the output of Display Driver circuit 204, thereby effectively blanking out the character displays physically associated with the individual data entry keys.

Although the embodiment described in detail above (and shown in the Figure in solid lines) employs a Clear signal CLR and Scramble signal A, both generated in response to a single manual operation of START button 32, it would clearly be possible to replace START button 32 with two separate buttons, one of which being a RESCRAMBLE button having the capability of generating a Scramble signal A but not a Clear signal CLR.

By activating such a RESCRAMBLE button, the user then would be able to cause Random Sequence Generator 202 to generate a new and different sequence of keyboard locations (which would be stored in the first RAM 206 and which would also be used to activate the character displays of display/keyboard unit 10) without resetting Data Counter 212. Accordingly, upon depressing such a RESCRAMBLE button, the user would be confronted with a different scrambled association of characters with keys, but could nevertheless continue to input a continuing sequence of data since Data Counter 212 which determines whether successive data words are loaded into new addresses in second RAM 208 or are written over data contained in the earlier addresses has not been reset.

Also visible in FIG. 5 and shown in dotted lines (thereby indicating its alternative nature) is a One-shot circuit 280 having as its input the output of AND-gate 260, which as discussed previously when enabled by Data Input signal C applies the Strobe output 262 of Keyboard Contacts Decoder 210 to the input 264 of Data Counter 212, thereby signifying that another data character has just been manually input by the user. By selecting the characteristics of One-shot circuit 280 such that its output is of a period much greater than the period between successive clock pulses CLK, the output will be, for all practical purposes, a signal of duration sufficiently random that it may serve as an alternative Scramble signal A without further processing. If employed, the One-shot circuit should delay its output relative to the Strobe pulse present Keyboard Contacts Decoder Strobe output 262, otherwise Flip-flop 216 would be prematurely reset and the just input data character would not necessarily be loaded into second RAM no. 208.

Referring now specifically to FIG. 6 which, as has been noted previously, depicts an exemplary embodiment of a Random Sequence Generator circuit usable in the arrangement illustrated in FIG. 1 to generate 80 different random dequences of the ten data input keys of keyboard 10, it may be seen that the output of the Sequence Generator is generated by a Modulo-4 Counter 300 whose output lines 302 and 304 together designate a particular one of the four rows of the keyboard, and by a Modulo-3 Counter 306 whose output lines 308 and 310 designate a particular one of the four rows of the keyboard, and by a Modulo-3 Counter 306 whose output lines 308 and 310 designate a particular one of the three columns ("00", "01", or "10").

Also visible in FIG. 6 is Modulo 10 Counter 200 which it will be noted as provided with a Count Disable ($\overline{CE}$) signal input 312 (mentioned previously in connection with FIG. 5 but not shown therein). Count Disable signal 312 is generated by AND-gate 314 and is high when (a) both output lines (302 and 304) of Modulo 4 Counter 300 are high (i.e. the row being designated is Row no. 4) and (b) the output from OR-gate 316 is also high indicating that at least one of the two output lines 308 and 310 of Modulo 3 Counter 306 is high (thus the designated column is not Column No. 1 but rather Column No. 2 or Column No. 3). At this point it may be noted that Modulo 4 (Row) Counter 300 is provided with an Up-Down input 318 generated by a first Flip-flop 320 and Modulo 3 (Column) Counter 306 is also provided with a similar Up-Down input 322 provided by a second Flip-flop 324. Thus, the setting of first Flip-flop 320 determines whether the Modulo 4 Counter counts the rows in the Up direction or the Down direction (i.e. from top to bottom or from bottom to top of the keyboard) and second Flip-flop 324 determines whether Modulo 3 Counter 306 counts the Columns Forwards or Backwards (i.e. from left to right or from right to left of the keyboard). It will also be noted that the Random Sequence Generator circuit of FIG. 6 is provided with a third Flip-flop 236 which enables one or the other of AND-gates 328 and 330, whose outputs are OR-ed by OR-gate 332 to provide the input 334 to Modulo 4 Row Counter 300. Assuming that the Q output of third Flip-flop 326 is high (thus enabling the first of the two AND-gates designated by the reference numeral 328) then each time the first output line 308 of Modulo-3 Counter 306 goes high (that is to say the Column Counter is designating the third column) then the Row Counter 300 is incremented to the next Row. Alternatively, if third Flip-flop 326 is in its alternative state, such that output $\overline{Q}$ is high, and the second of the two AND-gates associated with the input to the Row Counter is enabled (namely the AND-gate designated by the reference numeral 330), then when the Column Counter 306 is designating the second column, the row counter will be incremented.

As can be seen from FIG. 6, first Flip-flop 320 second Flip-flop 324 and third Flip-flop 326 are connected together serially in a divider type of arrangement with the output of the first Flip-flop serving as the input to the third, the output of the third serving as the input to the second. Since Modulo-10 Counter 200 is provided with a Terminal Count output TC, each time the count of nine has been attained, then the TC signal may be conveniently used as the input to first Flip-flop 320. Such an arrangement will have the effect of guaranteeing that Modulo-10 Counter 200, first Flip-flop 320, second Flip-flop 324 and third Flip-flop 326 were cycled through all eighty ($10\times2\times2\times2$) possible combinations of conditions in a regular sequence, so that probability of any one of the eighty possible combinations being the condition of the circuit at the time that the START signal A is terminated (i.e. the user has just released his finger from the START button) will be the same, and accordingly the distribution of the eighty different combinations will be quite uniform, especially if AND-gate 314 is disabled during the scrambling operation.

Thus, by virtue of the particular settings of first Flip-flop 320, second Flip-flop 326 and third Flip-flop 324, the location on the keyboard output by the Random Sequence Generator circuit will proceed from top to bottom or bottom to top, from right to left or left to right, and will be jump from one row to the next from the middle column or from the end column, thus the circuit is designated such that the Modulo 3 and Modulo 4 counters are not in regular syncrhonization with Modulo-10 Counter 200 (because of randomizing effects of the gates and Up-Down settings controlled by the three Flip-flops) then for any particular starting position within the eight basic cyclic sequences output by Random Sequence Generator circuit, any one of the ten digits output by the Modulo-10 Counter 200 may be associated with any of the ten locations (If a synchronous condition were ever detected between the row and column counters on the one hand, and the digit counter on the other hand, its effects could be eliminated by resetting either one or the other at the end of the scrambing operation). Thus it may be seen that with the exemplary circuit illustrated, 80 different combinations of character sequences associated with the particular keys of the keyboard may be generated in an unpredictable and apparently random manner.

Although eighty different sequences is more than sufficient to give the appearance of a random generation of sequences, by further modifications to the illustrated circuit additional different sequences could be generated, up to the theoretical maximum of ten factorial (10!=3,628,800).

Another example of a Random Sequence Generator circuit is illustrated in FIG. *6a.*

Referring specifically to that Figure and also to the preceeding description of FIG. 6, it may be seen that first Flip-flop 426 is functionally similar to third Flip-flop 326 of FIG. 6 in that it controls which of two AND-gates (AND-gate 328 or AND-gate 330) is enabled and accordingly whether the Sequence Generator jumps from one row to the next at the end column or at the middle column. The second Flip-flop 424 determines whether the signal applied to Up-Down input provided on a Modulo-10 Counter 400 is set to its "Up" position or "Down" position, in much the same way as second Flip-flop 324 of FIG. 6 determined whether the Up-Down input 322 to Modulo-3 Counter 306 was set to its Up or its Down position. It may be noted that although Modulo 4 (Row) Counter 400 is similar to Modulo 4 Counter 300 of FIG. 6 and the Modulo 3 (column) Counter 406 is similar to the Modulo 3 Counter 306 of FIG. 6, that the Row and Column Counters employed in the embodiment of FIG. *6a* need not be provided with inputs controlling whether they count upwards or downwards.

The control input of first Flip-flop 426 is provided by the output from an AND-gate 450, the inputs of which are Scramble signal A, the first digit ($D_0$) output of a second Modulo-10 Counter 452 and the second digit output ($D_1$) of said second Modulo-10 Counter. The control input to second Flip-flop 424 is provided by a second AND-gate 454, inputs of which are the Scramble signal A and the third digit ($D_2$) of second Modulo-10 Counter 452.

Although the Random Sequence Generator circuit of FIG. *6a* in fact generates only 40 different sequences associating the digits 0 through 9 with the ten keys of the Data Entry Keyboard 10, it does so in a manner which I have found to be quite erratic and unpredictable and therefore, for most intents and purposes, "random."

What is claimed is:

1. A secure keyboard input device for inputting secret data sequences formed from a set of characters, said terminal comprising:

a keyboard comprising a plurality of data keys, and means for generating upon the actuation of any of said keys a first signal representing which particular key was actuated;

scramble means for apparently randomly assigning individual ones of said characters to individual ones of said data keys;

a plurality of individual character displays adapted for displaying individual ones of said characters, each of said character displays being associated with a respective one of said data keys;

means for causing each of said displays to display the character then assigned by said scramble means to the data key associated with that particular display;

unscramble means for translating said first signal representing which particular key was actuated to a second signal representing the particular character then assigned to said particular key by said scramble means; and means for restricting the view of the character displays from other than the individual operating the keyboard.

2. The input device of claim 1 wherein:

said each of said data keys comprises a pushbutton and an associated electrical contact operatively coupled thereto, such that each manual actuation of a particular pushbutton results in a momentary change of state of the associated contact, and said keyboard further comprises a contact decoder circuit electrically coupled to each said contact for outputting said first signal as a multi-bit digital word representing which particular key was actuated and a strobe signal signifying a single actuation of one of said keys.

3. The input device of claim 1 further comprising:

a first memory means for storing data representing a particular assigned character at an address signifying a particular key, whereby said unscramble means may translate said first signal representing which particular key was actuated into said second signal representing a particular character then assigned to said key by employing said first signal to address said first memory means, whereupon the data output by said first memory means will represent the particular character then assigned to said particular key and accordingly may constitute said second signal.

4. The input device of claim 3, and which includes a second memory means, and in which said keyboard includes a contact decoder circuit electrically coupled to each of said keys for outputting said second signal as a multi-bit digital word representing which particular key was actuated, and a strobe signal signifying a single actuation of any one of said keys, and wherein in response to said strobe signal from said contact decoder circuit, said unscramble means stores the respective conditions of said second signal in said second memory means, thereby retaining a string of characters in said second memory means for possible later processing.

5. The input device of claim 4, wherein said first memory means and said second memory means are mutually exclusive sets of addresses within a single memory device.

6. The input device of claim 3 wherein the character displays associated with particular data keys are located below an upper surface of said keyboard, and wherein said keyboard incorporates collimating light shields for restricting the viewing angle from which the characters displayed by said character displays may be viewed.

7. The input device of claim 6, wherein each of said collimating light shields are in the form of a transparent bore along the central axis of a pushbutton operatively coupled to the corresponding one of said data keys.

8. The input device of claim 6, wherein each said character display comprises light emitting diodes emitting light of a given color, and each said display is provided with a transparent cover at the upper end of said collimating light shield, said cover being colored so as to act as a filter transmitting light only of a color similar to that emitted by said light emitting diodes.

9. A secure keyboard input terminal comprising:
a keyboard having a plurality of individual keys;
first means for generating an apparently random sequence of addresses corresponding to the key locations of said keyboard;
second means for generating a regular sequence of digital representations of a selected number of decimal digits;
third means for establishing correspondence between the individual addresses generated by said first means with the individual digits generated by said second means;
fourth means for displaying each digit generated by said second means in association with the corresponding keyboard key location generated by said first means; and
fifth means for translating the actuation of a particular keyboard key into a signal representing the particular digit then displayed in association with said key.

10. The input terminal of claim 9, wherein said first means comprises a row counter, a column counter, and a first randomizing circuit for establishing what condition of the column counter results in the incrementing of the row counter, and wherein said second means outputs digits in an ascending or descending sequence in response to the condition of a second randomizing means.

11. The device of claim 9 wherein said first means comprises:
a row counter provided with an up/down input;
a column counter provided with an up/down input;
a first randomizing device for randomly establishing the up or down counting direction for said row counter;
a second randomizing device for establishing the up or down counting direction of said column counter; and
a third randomizing device for establishing when said row counter is incremented/decremented relative to said column counter.

* * * * *